United States Patent [19]
Russo

[11] Patent Number: 6,167,078
[45] Date of Patent: Dec. 26, 2000

[54] CONSERVATION OF POWER IN A SERIAL MODEM

[75] Inventor: David W. Russo, Woodinville, Wash.

[73] Assignee: Motorola, Schaumburg, Ill.

[21] Appl. No.: 09/050,285

[22] Filed: Mar. 30, 1998

[51] Int. Cl.[7] .................................. H04B 1/38; H04L 5/16
[52] U.S. Cl. ............................................................ 375/222
[58] Field of Search ................................... 375/222, 220; 713/300; 327/143, 211, 544; 455/57

[56] References Cited

U.S. PATENT DOCUMENTS

| | | | |
|---|---|---|---|
| 4,521,891 | 6/1985 | Biba et al. ................................ | 375/222 |
| 5,903,601 | 5/1999 | Elnashar et al. ......................... | 375/220 |
| 5,931,950 | 8/1999 | Hsu ......................................... | 713/300 |

OTHER PUBLICATIONS

Simon Haykin, Communication Systems, 1994, John Wiley & Sons, New York, p. 356.

*Primary Examiner*—Stephen Chin
*Assistant Examiner*—Betsy L. Deppe
*Attorney, Agent, or Firm*—James A. Lamb

[57] ABSTRACT

A serial modem (14) having a phase-locked loop (22), a central processing unit (20), a serial buffer (26) and a universal asynchronous receiver transmitter (UART) (28), wherein the serial buffer (26) and the UART (28) are connected to a host device (10) via an asynchronous serial interface (32). The central processing unit (20) enters a sleep mode when data is not being received. A start bit s received at a predetermined baud rate via the asynchronous serial interface (32). An interrupt is activated to start a wake-up transition at the central processing unit (20) upon receipt of the start bit. A series of bits following the start bit is sampled and stored in the serial buffer (26) until the central processing unit (20) is enabled. After the central processing unit (20) is enabled, a remainder of the series of bits are sampled and stored at the UART (28).

5 Claims, 5 Drawing Sheets

CONSERVATION OF POWER IN A SERIAL MODEM

FIELD OF THE INVENTION

The present invention relates generally to conservation of power in a serial modem.

BACKGROUND OF THE INVENTION

A wireless modem, which has a simple asynchronous serial interface, usually never knows when a host device is going to attempt to transmit a serial character. This means the modem must always be ready to receive a serial character at any given time.

A wireless modem currently operates by utilizing an on-board phase-locked loop (PLL) to multiply a low-frequency crystal to a high-frequency to allow a central processing unit (CPU) to operate. When the CPU is in a low power sleep state, the PLL can require ten or more milliseconds to allow the CPU to reach an operating state. Moreover, the PLL must be operating in order for an industry standard receive universal asynchronous receiver transmitter (UART) to function (i.e., sampling and storing serial characters). Thus, the PLL and the CPU must remain in an operating state in order to receive all of the serial characters from the host device, thus preventing the CPU from entering what is essentially a low power sleep state.

In existing serial modem products, the sleep current is approximately nine milliamps (mA) because the CPU cannot enter a low power sleep state and still adequately respond to serial characters on the serial interface. With the current configuration of wireless modems, if the CPU is allowed to enter a low power sleep state, serial characters could be missed, which is unacceptable for most products. Thus, having the CPU enter a low power sleep state is not feasible in existing serial modem products because the PLL is not capable of acquiring a stabilized frequency from an off state in order to activate the CPU in a timely fashion so that the serial modem can respond to serial characters on the serial interface. Preventing the CPU from entering a low power sleep state presents significant problems for battery powered subscriber devices attempting to optimize power consumption.

A solution implemented in existing serial modem products to allow the CPU to enter a low power sleep state is to use a high speed oscillator that is always operating. Using a high speed oscillator permits the CPU to instantly move from a low power sleep state to an operating state without any latency. Using a high speed oscillator, however, requires significantly more power to be consumed, thus defeating the purpose of battery powered subscriber devices attempting to optimize power consumption.

Another solution which might be implemented in existing serial modem products to allow the CPU to enter a low power sleep state is to use a modem control line to wake the modem up prior to sending the serial characters. Using a modem control line, however, involves special software on the host device side of the connection which is not always possible to configure. Also, some host devices may not have control lines available to implement such a solution (e.g., host interfaces which only use a three wire connection).

Thus, there exists a need which allows the CPU to enter a low power sleep state and allows the modem to consume a minimum amount of power while responding to all serial characters on the serial interface in a timely fashion.

BRIEF DESCRIPTION OF THE DRAWINGS

Multiple embodiments of the invention are now described, by way of example only, with reference to the accompanying drawings in which.

DETAILED DESCRIPTION OF THE PREFERRED EMBODIMENT

A method and apparatus for conserving power in a radio frequency modem is described herein. The present invention allows a central processing unit (CPU) to enter a low power sleep state and allows a serial modem to consume a minimum amount of power while responding to all serial characters on the serial interface in a timely fashion. It is important to note that the CPU can enter a low power sleep state which is not an off state. Having the CPU enter a low power sleep state permits a quicker response time to serial characters than having the CPU respond to serial characters after entering an off state.

Figure 1:
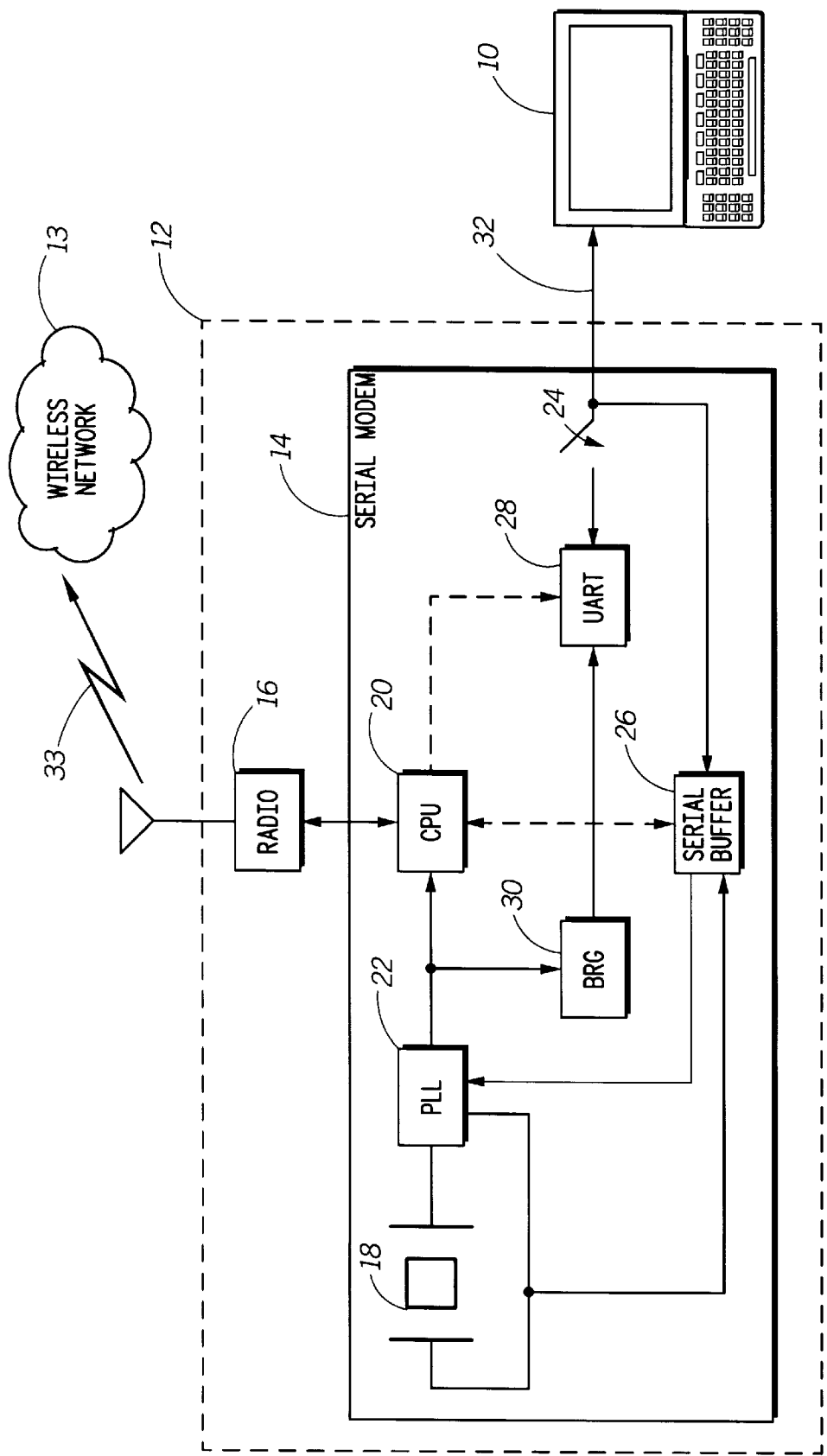
FIG. 1 illustrates a general block diagram according to a first embodiment of the present invention.

Referring to the figures, FIG. 1 illustrates a general block diagram according to the preferred embodiment of the present invention. As shown, an asynchronous serial interface 32 connects a host device 10 with a radio frequency modem 12, wherein the radio frequency modem 12 comprises a serial modem 14 and a radio 16. The radio 16 communicates to a wireless network 13. The wireless network 13 comprises any network which is capable of Supporting untethered computer communications. It is important to note that the present invention is applicable to any battery operated packet modem connected to a serial port, such as DataTAC™, Global System Mobile (GSM) packet radio systems, integrated Digital Enhanced Network (iDEN)™ and ReFLEX™ based serial modems manufactured by Motorola, Inc.

The serial modem 14 is comprised of a low-frequency oscillator (LFO) 18, a CPU 20, a phase-locked loop (PLL) 22, a switch 24, a serial buffer 26, a universal asynchronous receiver transmitter (UART) 28 and a baud rate generator (BRG) 30. The serial modem 14 utilizes an asynchronous serial interface 32 for transmitting and receiving an asynchronous bit stream to and/or from the host device 10.

The LFO 18 is a master clock source and the only oscillator source in the serial modem 14 to generate all of the necessary clocks for the serial modem 14. The LFO 18 is always operating, regardless if the remainder of the radio frequency modem 12 is in a low power sleep state.

The CPU 20 performs all of the necessary computational functions of the radio frequency modem 12. The CPU 20 is responsible for retrieving, buffering, interpreting and further processing the asynchronous bit stream. The asynchronous bit stream is assembled into a packet. The asynchronous bit stream is formatted to the correct wireless protocol and transported to a wireless network via a radio interface 33.

The PLL 22 is coupled to the LFO 18 and the CPU 20. The PLL 22 provides a high-frequency clock reference source for the CPU 20 as well as the remaining functions internal to the serial modem 14.

The switch 24 has a first state and a second state and is coupled to an asynchronous serial interface 32 for receiving the asynchronous bit stream. The switch 24 directs the asynchronous bit stream through the radio frequency modem 12. The switch 24 is a control point to allow switching of the asynchronous bit stream between the serial buffer 26 and the UART 28.

Figure 2:
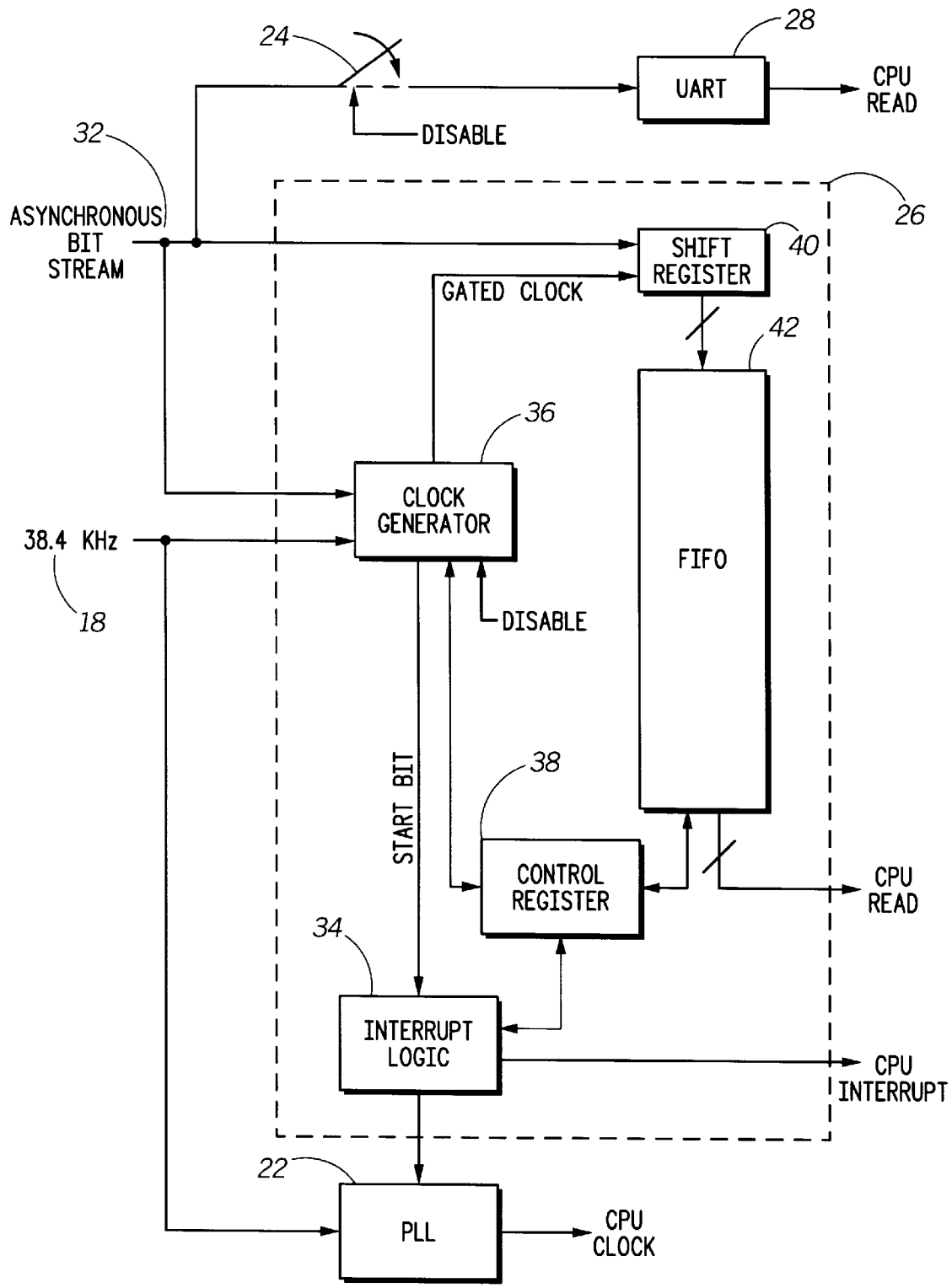
FIG. 2 illustrates a detailed block diagram of a serial buffer according to the first embodiment of the present invention.

As shown in detail in FIG. 2, the serial buffer 26 is coupled to the LFO 18, coupled to the asynchronous serial interface 32 and couplable to the PLL 22 via an interrupt logic component 34. The serial buffer 26 is a mechanism for sampling and storing the asynchronous bit stream while the UART 28 is inactive.

The serial buffer 26 may also comprise a clock generator 36, a control register 38, a shift register 40 and a first-in first-out (FIFO) memory component 42. The clock generator 36 examines the asynchronous bit stream and determines the occurrence of a start bit. The start bit is determined by the first occurrence of an edge from an idle state to an active state. The control register 38 operates as an interface between the CPU 20 and the serial buffer 26 for controlling activity within the serial buffer 26. The control register 38 configures the serial buffer 26 and informs the CPU 20 of the status of the serial buffer 26. The shift register 40 transforms the asynchronous bit stream into parallel data and records information into the FIFO memory component 42 at the completion of receiving A complete character. The FIFO memory component 42 is a storage medium which has sufficient depth to store all of the received characters until the CPU 20 has completed the wake-up cycle and is at full operating speed.

Referring back to FIG. 1, the UART 28 is coupled to the switch 24 when the switch 24 is drawn in the second state. The UART 28 provides a serial communication connection between tire host device 10 and the radio frequency modem 12.

The BRG 30 is coupled to the PLL 22 and to the UART 28. The function of the BRG 30 is to take the master clock source from the output of the PLL 22 and divide it down to an acceptable clock frequency for the UART 28 to function.

Because the radio frequency modem 12 is located close to the host device 10, the radio frequency modem 12 does not have the same noise problems to contend with that an industry standard UART must. The extra noise protection is discarded when the serial buffer 26 is operational and the CPU 20 is in a low power sleep state, without any adverse effects.

In standard asynchronous conditions, the transmitter source can be located a large distance (greater than 10 meters) from the receiver source. With a normal wire cabling connection between the transmitter source and the receiver source, the electrical interface is susceptible to external interference (radio frequency background noise, lighting, electrical switching transients, etc.). The distances between an embedded modem and the host device 10 is typically less than 0.1 meters. This reduces the possibilities of external noise sources from disturbing the communications.

In operation, when the host device 10 transmits an asynchronous bit stream of asynchronous characters to the radio frequency modem 12, a start edge transition is detected at the serial modem 14. The asynchronous bit stream is limited to a speed of 19,200 bps or less based upon the 38.4 KHz oscillator. Upon detection of the start edge transition, the clock generator 36 issues the correct clock pulses to the shift register 40 to sample the asynchronous bit stream at the best time instant. The samples for each bit are shifted and stored into the shift register 40.

Figure 3:
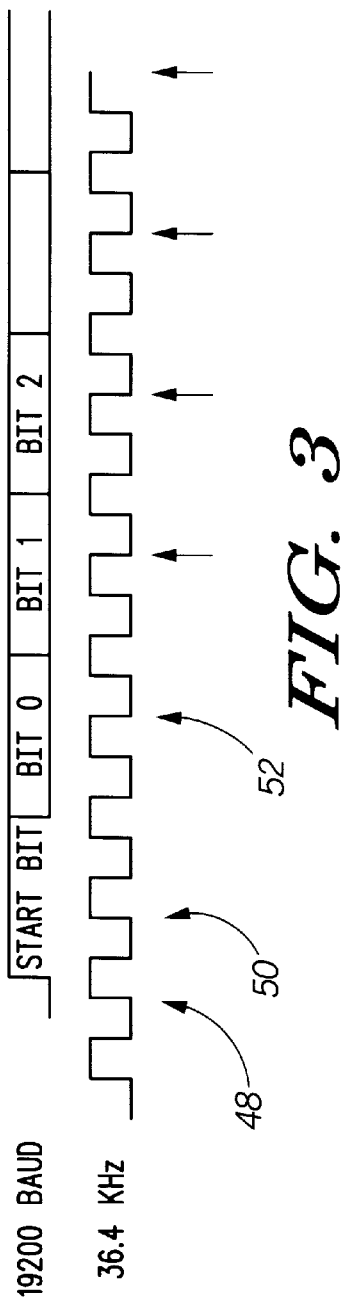
FIG. 3 illustrates a timing diagram for operation of the serial buffer of FIG. 2 according to the first embodiment of the present invention.

As shown in FIG. 3, the number of clock pulses and the timing of the clock pulses is determined by the baud rate configured within the control register 38. FIG. 3 depicts a timing diagram for operation of the serial buffer of FIG. 2, at two times (×2) the baud rate (19,200 bits per second (bps)), when the serial buffer 26 receives the asynchronous bit stream. Operating the serial buffer 26 at a low clock speed (i.e., ×2the baud rate) has a significant advantage. Such an advantage includes simple power savings of a lower frequency clock source and an optimal number of oscillators (e.g., one) which reduces the cost of the device and the ability to operate the CPU 20 in a low power sleep state. For example, the clock generator 36 begins searching for a start bit at rising edge 48. Rising edge 50 of the clock source is used to determine that a start edge transition occurred. The third falling clock edge 52 after the start edge transition is used to latch the received bit 0 into a serial shift register 40. The second falling edge is used thereafter. This continues until the pre-configured number of bits are loaded into the shift register 40. If the baud rate was 9,600 bps, as opposed to 19,200 bps, every fourth clock edge would be sampled.

To increase resolution, it is possible to use both positive and negative going edges to detect the start bit transition. Depending on where the start bit transition occurs relative to the two clock edges, it is possible to correctly receive the remainder of the asynchronous character. This improves the accuracy by clocking the serial characters close to their bit centers.

After a correct detection of a start bit transition, the start bit causes an interrupt to the CPU to start its wake-up transition. The received asynchronous characters are transferred from the shift register 40 into the receive FIFO memory component 42 located in the serial buffer 26. The receive FIFO 42 has sufficient depth to store all of the received asynchronous characters until the CPU 20 has completed the wake-up cycle and is at full operating speed. The depth of the receive FIFO memory component 42 is determined by the start-up time of the CPU 20. For the case of a ten millisecond CPU 20 start time, a twenty character receive FIFO memory component 42 is sufficient when the baud rate is set to 19,200 bps.

After the PLL clock is stable and the CPU 20 is fully awake, the CPU 20 executes a write command to the control register 38 within the serial buffer 26. The purpose of the CPU 20 executing the write command is to switch the serial receive line back to the UART 28. Switching the serial receive line back to the UART 28 must be performed in an intelligent manner. For example, if the serial buffer 26 is in the middle of receiving a character, i.e., the shift register 40 is active or a start bit has been detected, the switch over to the UART 28 must be delayed until the character has been completely received at the serial buffer 26. After the switch over to the UART 28 is completed, the serial buffer 26 notifies the switch over to the CPU 20 via the control register 38.

As shown in FIG. 2, when the CPU 20 is functioning, the serial buffer 26 is disabled, switch 24 is closed and the asynchronous bit stream is directed back to the UART 28. Asynchronous serial ports (i.e., UARTs), however, are not normally run at very slow clock speeds. The industry standard is to use a clock operating at sixteen times (×16) the baud rate. Using a clock operating at ×16 the baud rate gives good timing resolution to permit accurate bit level detection of the received symbol.

In contrast to the timing diagram illustrated in FIG. 3, the start bit and subsequent bits are sampled multiple times at the perceived center once the asynchronous bit stream is re-directed back to the UART 28. Each character bit thereafter is sampled multiple times and a majority vote is taken for each bit. Majority voting i, used to reduce noise effects and improve the reliability of the received data. If all samples do not agree, the character is discarded as an error condition.

The CPU 20 empties any received characters located at the serial buffer 26 after the asynchronous bit stream is re-directed back to the UART 28. The CPU 20 has the responsibility to ensure the receive FIFO memory component 42 in the serial buffer 26 is empty before reading characters from a receive FIFO memory component in the UART 28. Such a sequence in reading characters ensures order to the asynchronous bit stream.

After the asynchronous bit stream is completely received and processed, the CPU 20 determines if the UART 28 should be disabled and the serial buffer 26 enabled in order for the CPU to re-enter a low power sleep state. If the internal logic of the clock generator 36 determines there is no activity on the asynchronous serial interface 32 (i.e., the internal logic waits one or more character times without any active transitions on the asynchronous bit stream), the path to the UART 28 is disabled by opening switch 24 (i.e., the first state of the switch 24). The serial buffer 26 informs the CPU 20 that the path to the UART 28 is disabled and the CPU 20 ensures there is no data remaining in the UART 28. The CPU 20 then re-enters a low power sleep state by turning off the PLL 22.

Figure 4:
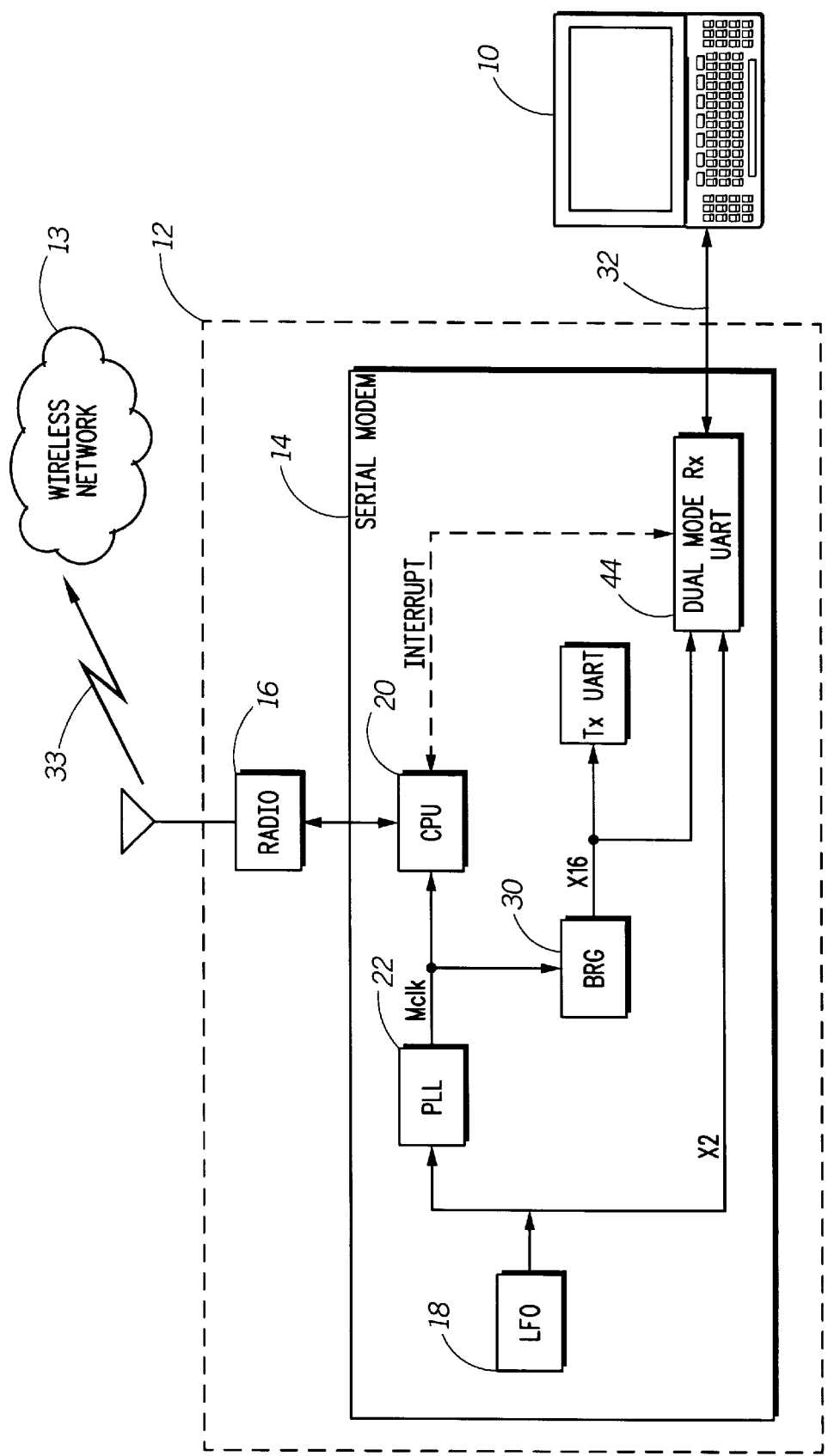
FIG. 4 illustrates a block diagram according to a second embodiment of the present invention.

FIG. 4 illustrates a block diagram according to a second embodiment of the present invention. The second embodiment of the present invention embeds the above technique within a dual mode receive UART 44. The dual mode receive UART 44 replaces the serial buffer 26, the switch 24, and the industry standard UART 28 in FIG. 1. Thus, instead of operating as an industry standard UART when the CPU 20 is in a low power sleep state, the receive clock in the dual mode receive UART 44 is switched to the LFO 18 (i.e., ×2 clock). When a character is received, the dual mode receive UART 44 generates an interrupt to start a wake-up transition for the CPU 20 and the PLL 22. When the CPU 20 and the PLL 22 are operational, the CPU 20 signals the dual mode receive UART 44 to switch clock sources back to the x16 clock and the dual mode receive UART 44 operates as an industry standard UART.

Figure 5:
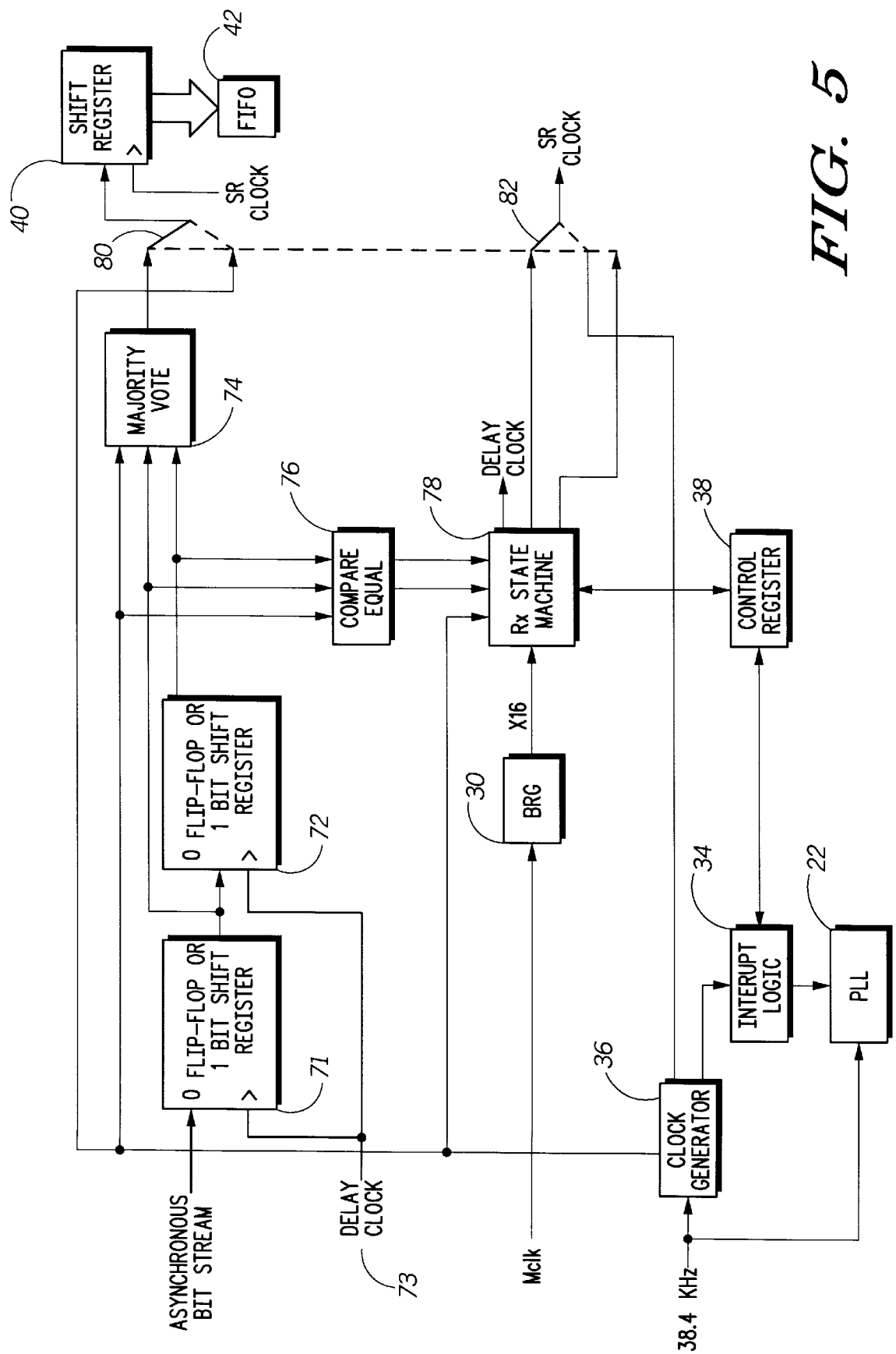
FIG. 5 illustrates a detailed block diagram according to the second embodiment of the present invention.

FIG. 5 is a detailed block diagram of the dual mode receive UART 44. The dual mode receive UART 44 comprises a first and second shift register 71, 72, a delay clock 73, a majority vote component 74, a compare equal component 76, a receive state machine 78, a clock generator 36, switches 80, 82, a shift register 40, a FIFO 42, a control register 38, and an interrupt logic component 34. The first shift register 71 is coupled to the delay clock 73 and to an asynchronous bit stream. The second shift register 72 is coupled to the first shift register 71 and to the delay clock 73. The clock generator 36 is coupled to a low frequency oscillator 18. The majority vote component 74 is coupled to the first and the second shift registers 71, 72 and to the clock generator 36. The compare equal component 76 is coupled to the first and second shift registers 71, 72 and to the clock generator 36. The receive state machine 78 is coupled to the compare equal component 76, a baud rate generator 30 and the control register 38. The shift register 40 is coupable to the clock generator 36 and coupable to the majority vote component 74. The FIFO 42 is coupled to the shift register 40 and to the control register 38. The interrupt logic component 34 is coupled to the clock generator 36 and the control register 38. The control register 38 is coupled to the interrupt logic component 34, to the receive state machine 78 and to the FIFO 42.

In operation, switches 80 and 82 are in the drawn state and the dual mode receive UART 44 functions as an industry standard UART. The one-bit shift registers 71 and 72 and the compare equal component 76 sample the asynchronous bit stream in search of a start bit. When all three bit samples agree, the compare equal component 76 determines the acceptance of a valid start bit. Acceptance of a valid start bit signals the receive state machine 78 to generate proper timing clocks for the shift register 40. The majority vote component 74 is used to sample the receive bit multiple times at the perceived center of the bit to determine the most likely state of the bit to present to the shift register 40 (as described above in the first embodiment). When the CPU 20 wants to enable the ×2 clock of the dual mode UART 44 because it wants to enter a low power sleep state, it requests switches 80 and 82 to change state via the control register 38. Switching of the clocks (i.e., switches 80 and 82) has to be controlled in an intelligent manner as described above in the first embodiment. The clocks cannot be switched in the middle of receiving characters. The receive state machine 78 has to wait until the an idle period on the asynchronous serial interface 32 such that there is no active character in process before performing the switch over. Once the ×2 clock is enabled, the clock generator 36 waits for a start bit, clocks the data into the shift register 40 at a best time and triggers an interrupt to the PLL 22 to activate the CPU 20.

Figure 6:
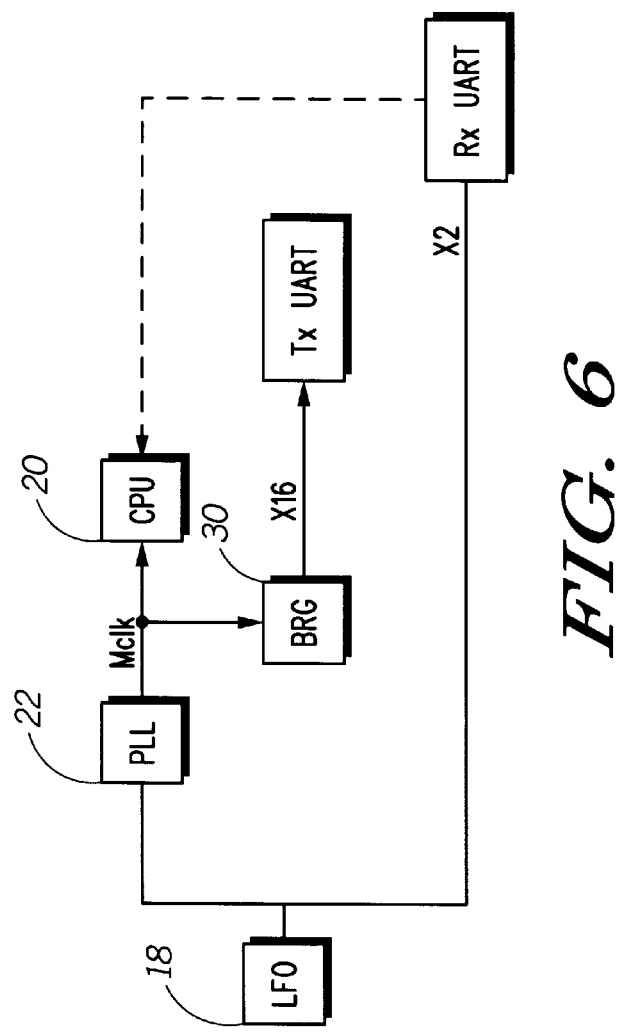
FIG. 6 illustrates a block diagram according to a third embodiment of the present invention.

A third embodiment is illustrated in FIG. 6. The third embodiment is implemented in the same manner as described above with respect to the first and the second embodiments, however, in the third embodiment, a x16 clock will always go to the transmitter source of the UART and a x2 clock will always go to the receiver source of the UART. Never switching the clock rates between the transmitter and receiver sources of the UART is less desirable because there is less noise protection existing in the UART.

A fourth embodiment is to store raw samples at every clock edge (at the occurrence of a start bit) and put the raw samples into a memory component or a buffer (e.g., FIFO). The CPU 20 decodes the raw samples into bits and characters. Thus, when the start bit edge is detected, the asynchronous bit stream is sampled at every clock edge (either a rising edge, a falling edge or both). These samples are stored in a memory component or buffer (e.g., a FIFO or a 384 bit shift register (20 ms/19,200 bps)). When the CPU 20 is operating, the CPU 20 reads all of these samples for processing. The CPU 20 knows the baud rate from the BRG 30, and therefore, the CPU 20 knows the length of each character and bit. The CPU 20 scans the samples and performs the sample-to-bit translation process. After the first character is decoded, the CPU 20 continues to scan the asynchronous bit stream looking for the occurrence of the next start bit, if it exists. In this way, the CPU 20 can recover all the received asynchronous characters.

While the invention has been described in conjunction with a specific embodiment thereof, additional advantages and modifications will readily occur to those skilled in the art. The invention, in its broader aspects, is therefore not limited to the specific details, representative apparatus and illustrative examples shown and described. Various alterations, modifications and variations will be apparent to those skilled in the art in light of the foregoing description. For example, the PLL can also enter a low power sleep state. Thus, it should be understood that the invention is not limited by the foregoing description, but embraces all such alterations, modifications and variations in accordance with the spirit and scope of the appended claims.

I claim:

1. In a serial modem having a phase-locked loop, a central processing unit, a serial buffer and a universal asynchronous receiver transmitter (UART), wherein the serial buffer and the UART are connected to a host device via an asynchronous serial interface, a method for conserving power in the serial modem comprising:

entering a sleep mode at the central processing unit when data is not being received;

receiving a start bit at a predetermined baud rate via the asynchronous serial interface;

activating an interrupt to start a wake-up transition at the central processing unit upon receipt of the start bit; and sampling and storing a series of bits following the start bit in the serial buffer until the central processing unit is enabled; and sampling and storing a remainder of the series of bits in the UART after the central Processing unit is enabled, wherein the UART samples the remainder of the series of bits at a clock speed of sixteen times the predetermined baud rate.

2. In a serial modem having a phase-locked loop, a central processing unit, a serial buffer and a universal asynchronous receiver transmitter (UART), wherein the serial buffer and the UART are connected to a host device via an asynchronous serial interface, a method for conserving power in the serial modem comprising:

entering a sleep mode at the central processing unit when data is not being received;

receiving a start bit at a predetermined baud rate via the asynchronous serial interface;

activating an interrupt to start a wake-up transition at the central processing in unit upon receipt of the start bit;

sampling and storing a series of bits following the start bit in the serial buffer until the central processing unit is enabled;

sampling and storing a remainder of the series of bits in the UART after the central processing unit is enabled; and further comprising, at the central processing unit, extracting the series of bits stored in the serial buffer before extracting the remainder of the series of bits stored in the WART.

3. An apparatus for conserving power in a serial modem comprising:

a low frequency oscillator;

an asynchronous serial interface for receiving asynchronous data:

a phase-locked loop coupled to the low-frequency oscillator;

a central processing unit coupled to the phase-locked loop, a switch, having a first state and a second state, coupled to the asynchronous serial interface for receiving asynchronous data;

a serial buffer having an interrupt logic component, wherein the serial buffer is coupled to the low-frequency oscillator, coupled to the asynchronous serial interface and couplable to the central processing unit via the interrupt logic component;

a universal asynchronous receiver transmitter (UART) coupled to the central processing unit and to the switch when the switch is drawn in the second state; and a baud-rate generator coupled to both the phase-locked loop and the UART.

4. An apparatus for conserving power in a serial modem comprising:

a low-frequency oscillator;

an asynchronous serial interface for receiving asynchronous data;

a phase-locked loop coupled to the low-frequency oscillator;

a central processing unit coupled to the phase-locked loop, a switch, having a first state and a second state, coupled to the asynchronous serial interface for receiving asynchronous data;

a serial buffer having an interrupt logic component, wherein the serial buffer is coupled to the low-frequency oscillator, coupled to the asynchronous serial interface and couplable to the central processing unit via the interrupt logic component;

a universal asynchronous receiver transmitter (UART) coupled to the central processing unit and to the switch when the switch is drawn in the second state, wherein the serial buffer, the UART and the switch are combined into a dual mode receive UART, and wherein the dual mode receive UART comprises:

a first shift register coupled to a delay clock and to the asynchronous serial interface;

a second shift register coupled to the first shift register and to the delay clock;

a clock generator coupled to a low frequency oscillator;

a majority vote component coupled to the first and second shift registers and to the clock generator;

a compare equal component coupled to the first and second shift registers and to the clock generator;

a receive state machine coupled to the compare equal component, a baud rate generator and a control register;

a third shift register coupable to the clock generator and coupable to the majority vote component;

a memory component coupled to the third shift register and to the control register;

an interrupt logic component coupled to the clock generator and the control register; and the control register coupled to the interrupt logic component, to the receive state machine and to the memory component.

5. A method of conserving power in a serial modem, wherein the serial modem comprises a central processing unit and a phase-locked loop, the method comprising:

providing a dual mode receive universal asynchronous receiver transmitter (UART) having a receive clock, a first mode and a second mode;

switching the receive clock to the first mode when the central processing unit is in a sleep state with the phase-locked loon being non operative;

switching the receive clock to the second mode after the central processing unit enters an active state with the phase-locked loop operating with a stabilized frequency; and after the step of switching the receive clock to the first mode at the dual mode UART, waiting idly in the first mode until a start bit is received;

activating an interrupt to the central processing until upon receipt of the start bit at a predetermined baud rate to start a wake-up transition at the central processing unit while operating in the first mode; and sampling and storing a series of bits following the start bit at two times the predetermined baud rate while operating in the first mode; and after the step of switching the received clock to the second mode, sampling and storing a remainder of the series of bits received at sixteen times the predetermined baud rate while operating in the second mode.

* * * * *